Nov. 24, 1964

A. D. REICHLE ETAL 3,158,662

ISOMERIZATION PROCESS

Filed Aug. 26, 1960

Alfred D. Reichle
Arthur L. Reitemeier    Inventors

By W. N. Wright

Patent Attorney

Nov. 24, 1964    A. D. REICHLE ETAL    3,158,662
ISOMERIZATION PROCESS
Filed Aug. 26, 1960    4 Sheets-Sheet 4

Alfred D. Reichle
Arthur L. Reitemeier    Inventors

By W. N. Wright

Patent Attorney

United States Patent Office 3,158,662
Patented Nov. 24, 1964

3,158,662
ISOMERIZATION PROCESS
Alfred Douglas Reichle and Arthur Lewis Reitemeier, Baton Rouge, La., assignors to Esso Research and Engineering Company, a corporation of Delaware
Filed Aug. 26, 1960, Ser. No. 52,241
10 Claims. (Cl. 260—683.75)

This invention concerns the isomerization of $C_5$ and/or $C_6$ paraffin hydrocarbons to produce isoparaffins employing a supported noble metal catalyst including aluminum chloride. A particular feature of the invention concerns the maintenance of critical processing conditions to achieve high catalyst activity and life by deliberate maintenance of a substantial portion of the reactants in liquid phase. The invention is based on the discovery that a remarkably improved isomerization process is feasible by use of these and other critical process features.

At the present time, refining interests are particularly concerned with methods to improve the octane number of light virgin naphtha constituents not susceptible to octane improvement by existing refinery operations such as catalytic cracking and reforming. Isomerization has been considered of particular interest for up-grading such light naphtha constituents, and considerable effort has been directed to the development of a practical isomerization process.

Catalytic agents suggested for this purpose have particularly included metal halides such as aluminum chloride activated by hydrogen chloride. While such catalytic systems have good potentials for isomerization, particular problems are encountered—particularly as concerns their tolerance for the presence of aromatic hydrocarbons in the isomerization feed. Another catalyst system which has been considered is a catalyst of the reforming type constituting platinum on alumina promoted with small amounts of halogen, in view of the aromatic tolerance of such catalysts.

Use of platinum on alumina catalysts for paraffin hydroisomerization has particularly been developed in connection with relatively high temperature operations. Temperatures in the reforming range of about 600 to 900° F. have particularly been explored using a hydrogen atmosphere of about 3,500 to 10,000 standard cubic feet per barrel. The catalyst in such operations has particularly included about 0.1 to 1.0% of platinum supported on activated alumina, and including about .1 to 1% of halogen or somewhat more. An active hydroisomerization catalyst for these conditions can be prepared by chloroplatinic acid impregnation of activated alumina, in which the catalyst retains the chlorine originally introduced with the chloroplatinic acid.

The present invention is directed to an improvement of such platinum hydroisomerization processes to enable conduct at temperatures of about 200 to 400° F. The objective in establishing use of such low temperatures is based on thermodynamic considerations going to the extent of conversion which is feasible. Thus, the thermodynamic equilibrium between iso and normal pentane at 800° F. is only 0.6 mole fraction of isopentane. On the other hand, at lower temperatures, the thermodynamic equilibrium is favorably affected to enable greater conversion of normal to isoparaffin. Thus, at 300° F., the mole ratio of isoparaffin to normal paraffin at thermodynamic equilibrium is about 0.8 mole fraction.

Particular problems are encountered in providing a practical low temperature platinum hydroisomerization process. Platinum catalysts of the type used in high temperature hydroisomerization are not satisfactory, having insufficient activity for use at the lower temperatures. This is based in part on the substantially lower isomerization rate between normal paraffins to isoparaffin at the lower temperatures involved. Another problem encountered is the extreme sensitivity to feed impurities in low temperature platinum hydroisomerization.

The present invention concerns a combination of critical features required for effective low temperature isomerization, that is, at temperatures of about 200 to 400° F., as distinct from high temperature hydroisomerization at temperatures of about 600 to 900° F. In accordance with this invention, the catalyst employed is a platinum or palladium catalyst supported on a refractory oxide such as alumina, and incorporating aluminum chloride. A preferred catalyst embodies about 0.3 to 0.6 weight percent of platinum supported on activated alumina, and containing about 5 to 15% of aluminum chloride. This catalyst is particularly effective for paraffin hydroisomerization at temperatures of about 200 to 400° F., pressures of about 700 to 1500 pounds per square inch, and employing about 300 to 2000 standard cubic feet of hydrogen per barrel of feed. The conditions are critically set within these ranges to maintain a substantial portion of the hydrocarbon feed in liquid phase. The process is specifically adapted to the isomerization of normal pentane, normal hexane or mixtures of these hydrocarbons. The invention is of particular application to the isomerization of the $C_5$-$C_6$ fraction of naphthas which contain aromatics and naphthenes in addition to $C_5$ and $C_6$ paraffinic hydrocarbons. The features of this invention are not applicable to the isomerization of other normal paraffins.

The invention is based on the unexpected and substantial advantages found for operation with at least about 20% of the normal paraffin feed in liquid phase. Maintenance of a substantial portion of the feed in liquid phase becomes feasible in low temperature hydroisomerization due to the lower temperatures employed and the fact that lower hydrogen pressures are required in such hydroisomerization. The critical temperature of normal pentane is 386° F. and the critical temperature of normal hexane is 453° F., so that isomerization temperatures below these limits must be used in order to maintain a substantial portion of these paraffins in liquid phase. Furthermore, as compared to the hydrogen supply used in high temperature hydrisomerization, normally above about 5,000 standard cubic feet per barrel, a hydrogen supply of about 1,000 s.c.f./bbl. or less is adequate in low temperature hydroisomerization. As will be developed herein, use of such relatively low hydrogen concentrations makes it feasible to liquefy a substantial portion of the isomerization feed at practical pressures. The distinction in the amount of hydrogen required is apparently due to basic process features as evidenced by the formation of undesired reaction by-products and catalyst deactivation. In any case, the fact that lower hydrogen pressures are required in low temperature hydroisomerization makes it feasible to maintain a substantial proportion of the feed paraffins in liquid phase.

Other features of the process of the instant invention concern the necessity for extreme feed purification to substantially eliminate oxygen, nitrogen, water and sulfur from the feed. The process of this invention is particularly adapted to effect catalyst promotion by use of catalyst promoters such as HCl, $CCl_4$, alkyl chlorides, or other halide promoters. Such halide promoters are used in amounts of about 0.01 to 1.0 volume percent based on feed. It is theorized that the effect of these promoters is substantially enhanced by maintenance of reactants in liquid phase. It is also advantageous to continuously add aluminum chloride in the isomerzation feed to maintain catalyst activity. About 5 to 500 p.p.m. of aluminum chloride are preferably employed. In a typical test, addition of 200 p.p.m. of $AlCl_3$ based on feed resulted in maintenance of a substantially higher catalyst activity level. AlCl₃ addition may be in either the feed stream or the hydrogen stream.

The features of this invention critically depend upon maintenance of a substantial proportion of the feed paraffins in liquid phase. To achieve this objective, it is necessary to correlate and adjust the reaction conditions with regard to the particular isomerization feed, the isomerization temperature, the total pressure maintained during isomerization, and the amount of hydrogen present as will be developed hereinafter. These process parameters must be selected so as to maintain at least about 20% of the paraffin reactants in liquid phase. In order to illustrate the co-dependence of these factors, in the isomerization of normal pentane at an isomerization pressure of 1500 p.s.i.g., at hydrogen rates above 3100 s.c.f./bbl. at temperatures of 300° F. or higher, none of the normal pentane can be maintained in liquid phase and the operation would be completely vapor phase. On the other hand, in isomerizing normal pentane at 300° F. and at a pressure as low as 500 p.s.i.g., substantial portions of the normal pentane may be maintained in liquid phase at hydrogen rates less than 1000 s.c.f./bbl.; specifically for example, at a hydrogen rate of 500 s.c.f./bbl. At these conditions, 50% of the normal pentane is maintained in liquid phase.

The following table shows these critical relations between total pressure, hydrogen concentration, and mole percent of hydrocarbon maintained in liquid phase for normal pentane and normal hexane at 300° F. The table shows the percent of hydrocarbon in liquid phase at the limits of 300–1500 standard cubic feet of hydrogen per barrel, and at pressures of 700–1500 p.s.i.g.

N-Pentane 300 s.c.f./B, 700 p.s.i.g.—85 mole percent HC as liquid
300 s.c.f./B, 1500 p.s.i.g.—95 mole percent HC as liquid
1000 s.c.f./B, 700 p.s.i.g.—35 mole percent HC as liquid
1000 s.c.f./B, 1500 p.s.i.g.—70 mole percent HC as liquid N-Hexane 300 s.c.f./B, 700 p.s.i.g.—94 mole percent HC as liquid
300 s.c.f./B, 1500 p.s.i.g.—98 mole percent HC as liquid
1000 s.c.f./B, 700 p.s.i.g.—79 mole percent HC as liquid
1000 s.c.f./B, 1500 p.s.i.g.—90 mole percent HC as liquid
1500 s.c.f./B, 700 p.s.i.g.—66 mole percent HC as liquid
1500 s.c.f./B, 1500 p.s.i.g.—84 mole percent HC as liquid In addition to the advantages indicated, the maintenance of a substantial portion of the paraffin feed in liquid phase has been found to remarkably improve the feed throughput which may be used. For example, as compared to a vapor phase platinum hydroisomerization operation at temperatures below 400° F., throughputs can be at least doubled when more than 20% of the isomerization feed is maintained in liquid phase, while maintaining equivalent conversion. It is presently felt that, among other factors responsible for these results, the presence of liquid phase material serves to wash the catalyst during isomerization so as to avoid catalyst deactivation. In this connection, it is known that polymeric $C_8+$ constituents are formed in $C_5$ or $C_6$ isomerization and that this material can deactivate the catalyst. This effect has been particularly noted when operating at the dew point, that is, at conditions at which incipient liquefaction is encountered. In this case, $C_8+$ material is apparently condensed onto the catalyst so as to speedily reduce and diminish catalyst activity.

The advantages of this invention are obtainable without necessitating maintenance of complete liquid phase conditions. This is an important feature of the invention since any necessity for maintaining all reactants in liquid phase would impose difficult, if not prohibitive, commercial limitations. This is due to the fact that the process of this invention requires maintenance of a substantial hydrogen atmosphere, and consequently would require extremely high total pressures on the system if full liquid phase conditions were to be maintained. Thus, for example, to isomerize normal pentane in liquid phase using a hydrogen rate of 1000 s.c.f./bbl., would necessitate use of total pressures above about 15,000 p.s.i.g. Consequently, it is a particular feature of this invention to avoid the necessity for maintenance of full liquid phase conditions, and to achieve the advantages of liquid phase operation by maintaining at least about 20 and up to about 95% of the paraffin feed in liquid phase.

The key feature making this possible is the restricted use of hydrogen in the process of this invention within the range of 300 to 1500 s.c.f./bbl., and preferably about 500 to 1000 s.c.f./bbl. This in turn is based on the discovery that such relatively low hydrogen rates, as distinct from the much higher rates employed in high temperature isomerization, are fully effective in the process of this invention. In turn, this enables use of total pressures in the range of about 700 to 1500 p.s.i.g., while enabling maintenance of a substantial portion of normal paraffins in liquid phase.

The process of this invention will be further understood from a description of the accompanying drawings illustrating features of the invention. In these drawings.

Figure 1:
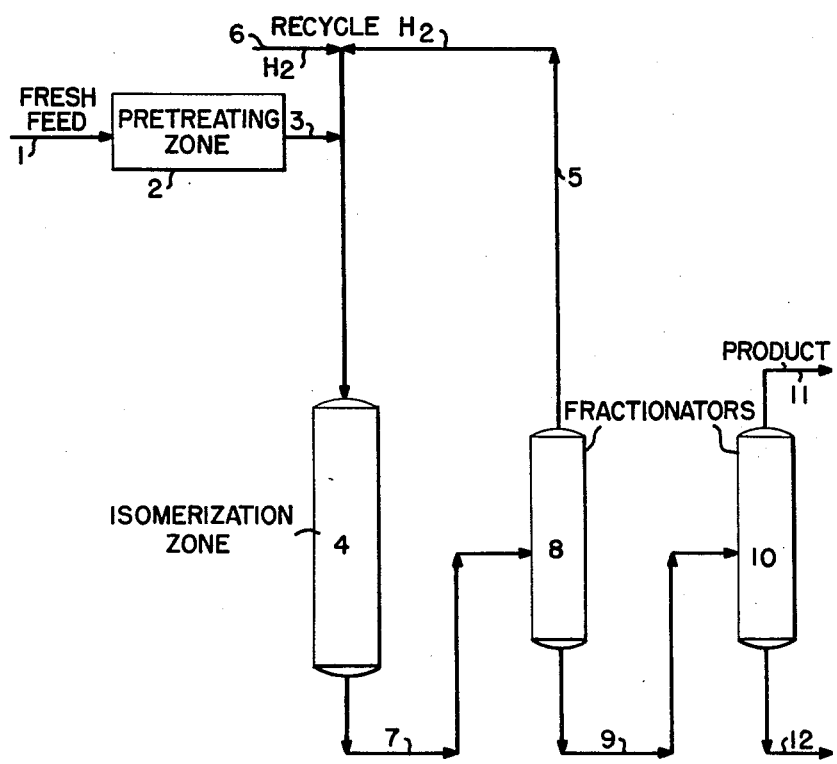
FIGURE 1 represents a flow plan of a preferred embodiment of the invention.

Referring now to FIGURE 1, the paraffinic feed to be isomerized, comprising a $C_5$ and/or $C_6$ paraffin hydrocarbon, is passed through line 1 to a feed pretreatment zone 2. The feed will constitute a paraffinic fraction obtained from crude distillation facilities in normal refining operations, so fractionated as to constitute substantially pure paraffinic material. However, in the conduct of this invention, extremely pure feed is required so that feed pretreatment zone 2 is used to substantially eliminate traces of oxygen, nitrogen and sulfur normally present in such refinery stocks. Suitable feed pretreatment may include a hydrofining type of operation and treatment with molecular sieves to eliminate such compounds. It is particularly preferred to include treatment of the feed with aluminum chloride or supported AlCl₃ and for this purpose, the feed stream may be passed through a bed of aluminum chloride supported on porocel at temperatures of about 300° F. Suitable hydrofining conditions, for example, comprise treatment at 600° F., 450 p.s.i.g., ½ v./v./hr.; employing 1000 cubic feet of hydrogen per barrel and using a cobalt molybdate on alumina hydrofining catalyst. The purified feed is passed through line 3 to the hydroisomerization reactor 4.

Reactor 4 may be filled with the platinum hydroisomerization catalyst, preferably constituting about 0.3 to 0.6% of platinum on pure activated alumina containing about 10% of aluminum chloride. This catalyst can be prepared by chloroplatinic acid impregnation of alumina followed by impregnation with aluminum chloride, as by subliming aluminum chloride onto the catalyst, at temperatures of about 300° F. or somewhat higher. The catalyst may be suitably impregnated with aluminum chloride directly in the isomerization reactor if desired. About 10–15 weight percent of AlCl₃ may be added to the top of the bed of platinum on alumina catalyst. The AlCl₃ may then be dispersed through the bed by passing hydrogen downwardly through the bed at temperatures of about 300 to 900° F. Typically this requires a period of about 1–16 hours for thorough aluminum chloride impregnation dependent on the temperature used. Hydrogen is brought into the reactor through recycle line 5 or by means of fresh make-up line 6 so as to provide about 300 to 1500 s.c.f./bbl. of hydrogen. The reactor is maintained at a temperature in the range of 200 to 400° F. during the isomerization, which may be accomplished by preheating of the feed streams to the reactor.

The process is preferably operated at throughputs above 0.5 v./v./hr., and preferably at about 1 to 5 v./v./hr. carbon in liquid phase during these runs. Results are shown in Table I.

TABLE I

*Mixed Phase Operations, $C_5/C_6$ and $C_5$*

| Phase | Pressure, p.s.i.g. | $H_2$ Rate, c.f./B. | V./v./hr. | Conversion, Wt. Percent ||| Percent HC in Liquid Phase |
|---|---|---|---|---|---|---|---|
| | | | | $i-C_6/p-C_6$ | $2,2-DMB/p-C_6$ | $i-C_5/p-C_5$ | |
| Vapor [1] | 400 | 6,400 | 0.52 | 84.6 | 19.7 | 50.5 | 0 |
| Mixed [1] | 400 | 400 | 0.92 | 84.3 | 20.3 | 63.7 | 80 |
| Vapor [1] | 400 | 5,000 | 0.5 | 86.3 | 21.0 | 58.7 | 0 |
| Mixed [1] | 700 | 1,200 | 1.0 | 85.8 | 24.3 | 66.1 | 67 |
| Vapor [1] | 400 | 5,000 | 0.5 | 85.1 | 20.2 | 59.5 | 0 |
| Mixed [1] | 1,000 | 1,200 | 0.9 | 84.7 | 23.9 | 69.4 | 78 |
| Mixed [1] | 750 | 1,900 | 0.8 | 85.0 | 22.9 | 68.4 | 52 |
| Vapor [2] | 400 | 5,000 | 0.5 | | | 71.2 | 0 |
| Mixed [2] | 750 | 1,310 | 1.2 | | | 73.7 | 25 |

[1] 23% $C_5$ and 45% of $C_6$, balance 2% CP, 14% MCP, 14% CH, 2% $i-C_7$'s.
[2] n-pentane.

Isomerization reaction products are withdrawn from the reactor through line 7 and passed to fractionator 8 in which hydrogen is stripped from the isomerization products for recycle to the reactor through line 5. The stripped products are then passed as a bottoms product from fractionator 8 to line 9 for product fractionation in distillation zone 10. Isoparaffin products are removed from fractionator 10 through line 11 as an overhead stream while heavier products are eliminated as a bottoms product through line 12.

Figure 2:
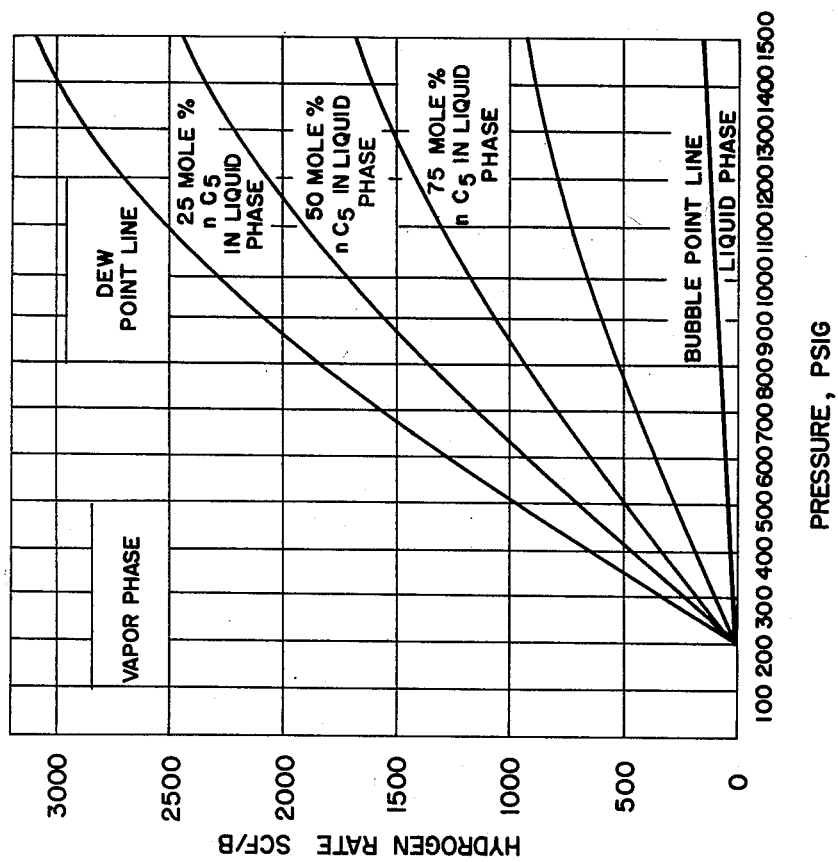
FIGURE 2 shows the vapor-liquid equilibrium for a normal pentane and hydrogen system at 300° F.
Figure 3:
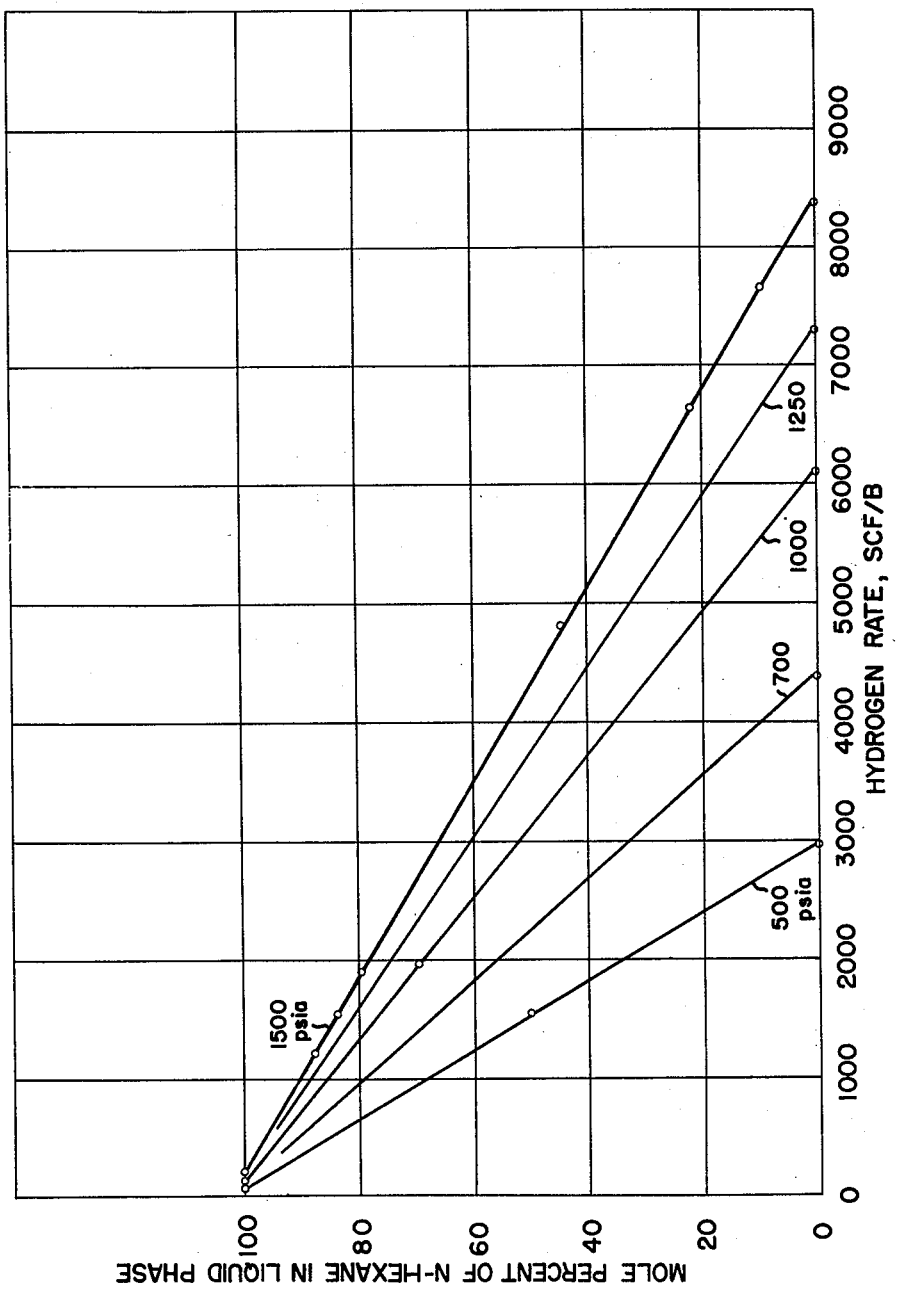
FIGURE 3 shows the vapor-liquid equilibrium for a normal hexane/hydrogen system at 300° F.
Figure 4:
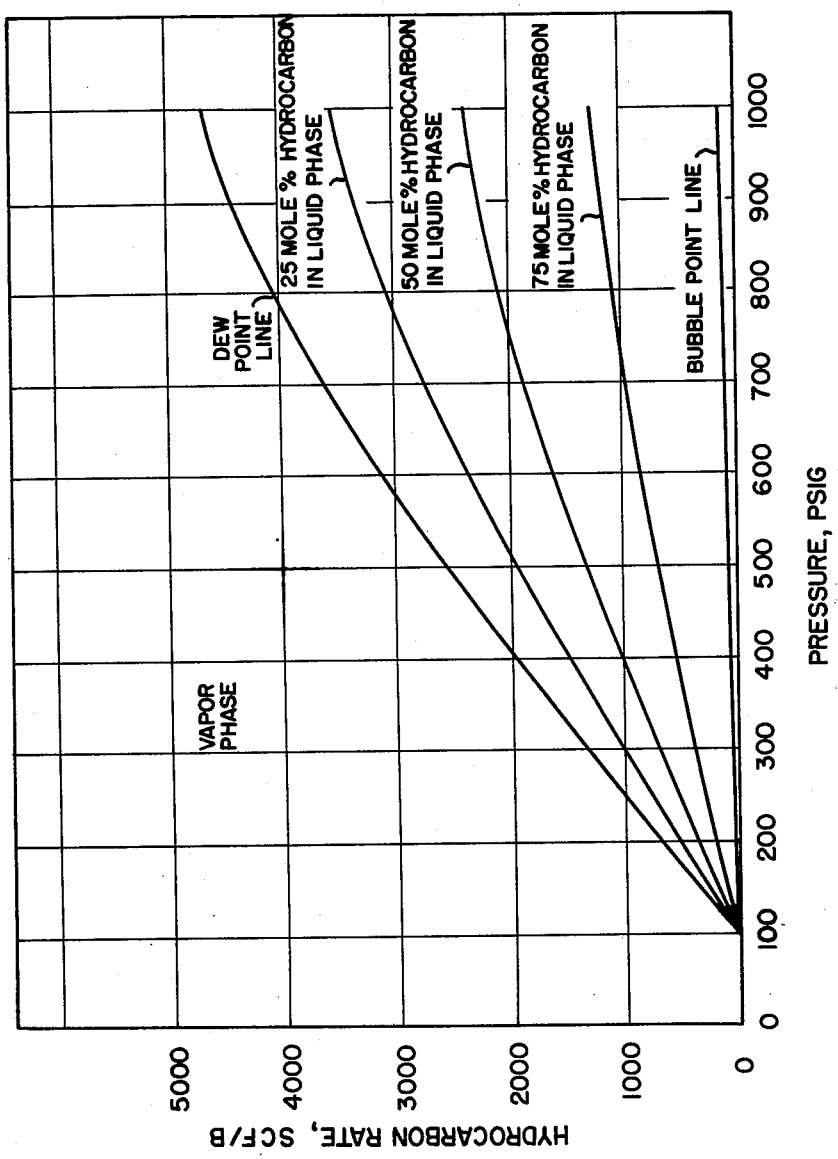
FIGURE 4 shows the vapor-liquid equilibrium for a $C_5/C_6$ paraffinic feed and hydrogen at 300° F.

In operation of the process described, the feed composition, isomerization temperature, total reactor pressure and hydrogen partial pressure are so adjusted as to maintain 20 to 70% of the feed paraffins in liquid phase. Selection of operative conditions to achieve such operation can be made by computations based on these variables. FIGURES 2, 3 and 4 of the drawings represent vapor-liquid equilibrium plots correlating the process variables identified for the feeds to be processed at the preferred temperature of 300° F. These phase diagrams are based on conventional vapor-liquid relations as described in "Chemical Engineers Handbook" by John H. Perry, First Edition, pages 1164–1176, using fugacity charts published in the "Data Book on Hydrocarbons" by J. B. Maxwell, Section 5.

In the isomerization of a normal pentane feed as shown in FIGURE 2, for example, employing 300 s.c.f./bbl. of hydrogen at the temperature of 300° F., total pressures to be maintained during isomerization would fall in the range of about 325 to 450 p.s.i.g. In this specific case, it could be practical to employ somewhat higher total pressures, although as noted, process advantages would not be obtained thereby.

The nature of this invention and the advantages of it are indicated by the following examples.

EXAMPLE 1

In a series of comparative experiments, conditions were adjusted in the isomerization of $C_5$ and a mixture of $C_5/C_6$ normal paraffins to show the advantages of maintaining a substantial portion of the paraffins in liquid phase. The $C_5/C_6$ mixture contained 23% $C_5$, 45% $C_6$, 2% cyclopentane, 14% methyl cyclopentane, 14% cyclohexane and 2% $i-C_7$'s. In these runs, the catalyst employed constituted 0.6% of platinum supported on gamma alumina and containing 10% of aluminum chloride. Conditions of total pressure and hydrogen rate were adjusted to maintain the indicated percentage of hydro- It will be noted from these data that in every comparative case shown, maintenance of more than 25% of the hydrocarbon in liquid phase enabled equivalent or superior paraffin conversion at substantially double throughputs, as compared to the vapor phase cases. Also, at the same percent $i-C_6/p-C_6$, mixed phase produced higher yields of 2,2-DMB and $i-C_5$ than gas phase. This is an unexpected and distinct advantage for mixed phase operation. It will also be noted that in the range of 25 to 80% liquid phase operations, conversions did not vary appreciably.

EXAMPLE 2

During a run using $AlCl_3$ impregnated with $Pt-Al_2O_3$ catalyst (0.6% Pt) and a hydrofined $C_5/C_6$ feedstock containing 0.1 volume percent $CCl_4$ at 300° F., 400 p.s.i.g., 1.5 v./v./hr. and with either 4000 c.f. $H_2/B$ (vapor phase) or 1500 c.f. $H_2/B$ (mixed phase with 20–40% hydrocarbon as liquid), the catalyst activity declined at a rate of 0.52 $k$ per 100 Vf/Vc (volumes of feed/volume of catalyst). At this time the reaction rate constant, $k$, had a value of 1.74. Operation during the next 100 Vf/Vc ranged from slightly above to 20% below the dew point.

Returning at 240 Vf/Vc to operating conditions similar to those shown above (400 p.s.i.g., 1500 c.f. $H_2/B$ and 0.5 v.v./hr. which gave 20–40% of the hydrocarbon as liquid), resulted in a rate constant of 0.58. If the decline rate during the period of dew point operation had been equivalent to that previously established for both mixed phase and vapor phase operation, the rate constant would have been 1.21. It is therefore concluded that dew point operation more than doubles the rate of catalyst activity decline, compared to either vapor phase or mixed phase operation.

EXAMPLE 3

This example shows the extreme criticality of trace amounts of catalyst poisons in low temperature mixed phase isomerization. Data for normal pentane isomerization was obtained in batch autoclave tests conducted at 300° F., 400 p.s.i.g., at a 5/1 oil to catalyst ratio, for a period of 5 hours, using a platinum on alumina catalyst containing 0.6 weight percent platinum and including 6–7 weight percent of $AlCl_3$. 0.1 volume percent of $CCl_4$ was also included as the catalyst promoter. The relative reaction rates ("$k$") were obtained for trace amounts of oxygen in the form of water, nitrogen present as n-butylamine, and sulfur present as butyl mercaptan. Results of these tests are shown in Table II.

TABLE II

*Poisoning Effects.—Mixed Phase Hydroisomerization of n-Pentane*

| Poison | Concentration | | Relative "k" |
| --- | --- | --- | --- |
| | P.p.m. in Batch Test | Equivalent p.p.m. in Flow Test @ 1,000 Vf/Vc | |
| None | | | 100 |
| $H_2O$ | 105 | 0.5 | 81 |
| Basic Nitrogen | 200 | 1.0 | 67 |
| Sulfur | 200 | 1.0 | 27 |

It will be noted that the presence of oxygen, nitrogen or sulfur sharply reduced the isomerization reaction rates. This is particularly indicated in the column showing the equivalent concentrations of these poisons when expressed on the basis of 1000 volumes of feed per volume of catalyst. In accordance with this invention, it is therefore necessary to employ extremely pure feeds having less than about 5 p.p.m. of oxygen, 2–5 p.p.m. of nitrogen, and 1–5 p.p.m. of sulfur. Particularly effective feed pretreatment is obtained by hydrofining the feed, treating with molecular sieves, silica gel or other drying agents, and percolation over aluminum chloride preferably supported on alumina or bauxite. In such pretreatment, a hydrofining catalyst such as cobalt molybdate is employed at about 500 to 600° F., 200 to 500 p.s.i.g., at throughputs of about 0.5 to 4 v.v./hr., and with 200 to 1000 s.c.f./bbl. of hydrogen. Drying may be achieved at temperatures of about 50 to 150° F. and throughputs of about 0.5 to 3.0 using 4A molecular sieves as the drying agent. The aluminum chloride pretreatment is preferably conducted at about 50 to 300° F. using about 5–15 weight percent of aluminum chloride supported on Porocel at throughputs of about 0.5–2.0 v.v./hr. This combination of feed pretreatment has been found to completely eliminate contaminants so as to enable catalyst maintenance without loss of activity for periods of more than 200 hours.

What is claimed is:

1. In the isomerization of $C_5$ or $C_6$ paraffins by contact with a supported platinum catalyst containing aluminum chloride at a temperature of about 200 to 400° F., a pressure of about 400 to 1500 p.s.i., in the presence of about 300 to 2000 standard cubic feet of hydrogen per barrel of feed; the improvement which comprises maintaining the said temperature, pressure and hydrogen concentrations at conditions to maintain between 20 and 95% of the said paraffins in liquid phase, and continuously including from 5 to 500 p.p.m. of aluminum chloride in the feed.

2. The process defined by claim 1 in which the said catalyst comprises platinum on alumina, including about 5 to 15% of aluminum chloride.

3. The process defined by claim 1 in which about .01 to 1.0 volume percent on feed of a halide promoter is present during said isomerization.

4. The process defined by claim 1 including the step of purifying said paraffins so as to have an oxygen content below about 5 p.p.m., a sulfur content below about 5 p.p.m., and a nitrogen content below about 5 p.p.m.

5. The process of isomerizing normal pentane which comprises contacting the normal pentane with a platinum on alumina catalyst containing about 0.3 to 0.6% platinum and about 5 to 15% of aluminum chloride, at a pressure of about 400 to 1500 p.s.i.g., at a temperature of about 200 to 400° F., and in contact with about 300 to 1000 standard cubic feet of hydrogen per barrel of feed, in which the said conditions of temperature, pressure, and hydrogen concentration are selected to maintain between 20 and 95% of the normal pentane in liquid phase, and continuously including from 5 to 500 p.p.m. of aluminum chloride in the feed.

6. The process of isomerizing normal hexane which comprises contacting the normal hexane with a platinum on alumina catalyst containing about 0.3 to 0.6% platinum and about 5 to 15% of aluminum chloride, at a pressure of about 400 to 1500 p.s.i.g., at a temperature of about 200 to 400° F., and in contact with about 500 to 2000 standard cubic feet of hydrogen per barrel of feed, in which the said conditions of temperature, pressure, and hydrogen concentration are selected to maintain between 20 and 95% of the normal hexane in liquid phase, and continuously including from 5 to 500 p.p.m. of aluminum chloride in the feed.

7. The process of isomerizing a mixture of $C_5$ and $C_6$ normal paraffins which comprises contacting the mixture of $C_5$ and $C_6$ normal paraffins with a platinum on alumina catalyst containing about 0.3 to 0.6% platinum and about 5 to 15% of aluminum chloride, at a pressure of about 400 to 1500 p.s.i.g., at a temperature of about 200 to 400° F., and in contact with about 500 to 2000 standard cubic feet of hydrogen per barrel of feed, in which the said conditions of temperature, pressure, and hydrogen concentration are selected to maintain between 20 and 95% of the mixture of $C_5$ and $C_6$ normal paraffins in liquid phase, and continuously including from 5 to 500 p.p.m. of aluminum chloride in the feed.

8. The process of isomerizing a hydrocarbon stream containing a mixture of $C_5$ and $C_6$ paraffins which comprises contacting said hydrocarbon stream with a supported platinum group metal catalyst containing aluminum chloride at a temperature of about 200° to 400° F., a pressure of about 400 to 1500 p.s.i. and in the presence of from about 300 to 2000 standard cubic feet of hydrogen per barrel of feed, the conditions of temperature, pressure and hydrogen concentration being selected so as to maintain between 20 and 95% of said paraffins in the liquid phase.

9. The process of claim 8 wherein about 5 to 500 p.p.m. of aluminum chloride is included in the hydrogen feed stream.

10. The process of claim 8 wherein said supported catalyst comprises platinum on alumina including about 5 to 15% of aluminum chloride and said conditions of temperature, pressure and hydrogen concentration are selected so as to maintain between 25 and 80% of said hydrocarbons in the liquid phase.

References Cited in the file of this patent

UNITED STATES PATENTS

| 2,900,425 | Bloch et al. | Aug. 18, 1959 |
| 2,924,629 | Donaldson | Feb. 9, 1959 |
| 2,938,062 | Perry | May 24, 1960 |

FOREIGN PATENTS

| 555,861 | Great Britain | Sept. 9, 1943 |